(12) United States Patent
Faruque et al.

(10) Patent No.: US 10,538,182 B2
(45) Date of Patent: Jan. 21, 2020

(54) DEFORMABLE ARMREST HAVING A PATTERNED ARRAY OF CHANNELS

(71) Applicant: FORD GLOBAL TECHNOLOGIES, LLC, Dearborn, MI (US)

(72) Inventors: Mohammed Omar Faruque, Ann Arbor, MI (US); James Chih Cheng, Troy, MI (US); Yijung Chen, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 16/001,457

(22) Filed: Jun. 6, 2018

(65) Prior Publication Data

US 2018/0281649 A1 Oct. 4, 2018

Related U.S. Application Data

(62) Division of application No. 15/044,390, filed on Feb. 16, 2016, now Pat. No. 9,994,137.

(51) Int. Cl.
| | |
|---|---|
| *B60N 2/75* | (2018.01) |
| *B29C 64/118* | (2017.01) |
| *B33Y 10/00* | (2015.01) |
| *B33Y 80/00* | (2015.01) |
| *B60N 2/70* | (2006.01) |
| *B29C 64/112* | (2017.01) |

(Continued)

(52) U.S. Cl.
CPC .............. *B60N 2/75* (2018.02); *B29C 64/112* (2017.08); *B29C 64/118* (2017.08); *B33Y 10/00* (2014.12); *B33Y 80/00* (2014.12); *B60N 2/7017* (2013.01); *B60N 2/78* (2018.02); *B29K 2021/003* (2013.01); *B29L 2009/00* (2013.01); *B29L 2031/3026* (2013.01)

(58) Field of Classification Search
CPC .......... B60N 2/75; B60N 2/78; B60N 2/7017; B60N 3/02; B29C 64/118; B29C 64/112; B33Y 10/00; B33Y 80/00; B29K 2021/003; B29L 2009/00; B29L 2031/3026; B60R 21/04; B60R 21/0428
See application file for complete search history.

(56) References Cited

U.S. PATENT DOCUMENTS

| | | | |
|---|---|---|---|
| 3,362,749 A | 1/1968 | Clement | |
| 3,400,979 A | 9/1968 | James | |

(Continued)

FOREIGN PATENT DOCUMENTS

| | | |
|---|---|---|
| JP | H10166864 A | 6/1998 |
| WO | 2014/093453 A1 | 6/2014 |
| WO | 2015006471 A1 | 1/2015 |

OTHER PUBLICATIONS http://gmauthority.com/blog/2013/06/how-gm-used-3d-printing-to-refresh-interior-ext; How GM Used 3D Printing to Refresh Interior, Exterior of 2014 Chevy Malibu, by GM Authority Staff, dated Jun. 10, 2013; pp. 1-4; Date Retrieved Sep. 30, 2015.

*Primary Examiner* — Moshe Wilensky
(74) *Attorney, Agent, or Firm* — Frank MacKenzie; Brooks Kushman P.C.

(57) ABSTRACT

An automotive armrest includes an elastic core defining a patterned array of channels extending therethrough such that the elastic core exhibits a predetermined target vertical stiffness and a predetermined target lateral stiffness different than the predetermined target vertical stiffness. The automotive armrest also includes a skin arranged with the elastic core.

10 Claims, 10 Drawing Sheets

(51) Int. Cl.
  *B29K 21/00* (2006.01)
  *B29L 9/00* (2006.01)
  *B29L 31/30* (2006.01)

(56) References Cited

U.S. PATENT DOCUMENTS

| | | | |
|---|---|---|---|
| 3,989,275 A | 11/1976 | Finch et al. |
| 4,869,543 A | 9/1989 | Grimes |
| 5,306,066 A | 4/1994 | Saathoff |
| 5,445,430 A | 8/1995 | Nichols |
| 5,573,272 A | 11/1996 | Teshima |
| 5,585,058 A | 12/1996 | Kolosowski |
| 6,142,563 A | 11/2000 | Townsend et al. |
| 6,568,743 B1 | 5/2003 | Jayasuriya et al. |
| 6,893,077 B1 | 5/2005 | DeJongh |
| 7,828,388 B2 | 11/2010 | Thomas |
| 8,007,369 B2 | 8/2011 | Soracco |
| 8,454,071 B2 | 6/2013 | Stoia |
| 9,114,773 B2 | 8/2015 | Sundararajan et al. |
| 9,145,076 B2 | 9/2015 | Platzek et al. |
| 9,180,830 B1 | 11/2015 | Faruque et al. |
| 9,527,458 B2 | 12/2016 | Sperl et al. |
| 9,610,873 B2 | 4/2017 | Jayasuriya et al. |
| 2002/0002937 A1 | 1/2002 | Modesitt et al. |
| 2004/0195064 A1 | 10/2004 | Tamada et al. |
| 2005/0168003 A1 | 8/2005 | Wolff et al. |
| 2006/0076202 A1 | 4/2006 | Tamada et al. |
| 2006/0220290 A1 | 10/2006 | Tamada et al. |
| 2007/0108830 A1 | 5/2007 | Hessler et al. |
| 2008/0160250 A1 | 7/2008 | Adler et al. |
| 2008/0225302 A1 | 9/2008 | Nagatoshi et al. |
| 2009/0167055 A1 | 7/2009 | Niezur et al. |
| 2009/0256384 A1 | 10/2009 | Hughes, Jr. et al. |
| 2010/0276957 A1 | 11/2010 | Hughes, Jr. et al. |
| 2013/0062899 A1 | 3/2013 | Stoia |
| 2013/0221191 A1 | 8/2013 | Sears et al. |
| 2014/0062149 A1 | 3/2014 | Mueller |
| 2016/0023768 A1 | 1/2016 | Tute et al. |
| 2016/0325520 A1 | 11/2016 | Berger |

DEFORMABLE ARMREST HAVING A PATTERNED ARRAY OF CHANNELS

CROSS-REFERENCE TO RELATED APPLICATION

This application is a divisional of application Ser. No. 15/044,390, filed Feb. 16, 2016, the disclosure of which is hereby incorporated in its entirety by reference herein.

TECHNICAL FIELD

The disclosure relates to an automotive armrest having an array of channels and a method of producing the same.

BACKGROUND

An armrest is a feature routinely added to modern vehicles to provide comfort to the driver and passengers who may wish to rest their arms while sitting in the vehicle. Several different types of armrests have been developed including an armrest built into a vehicle door or back panel.

SUMMARY

In at least one embodiment, an automotive armrest is disclosed. The armrest includes an elastic core defining a patterned array of channels having a same orientation extending therethrough. The elastic core exhibits a predetermined target vertical stiffness and a predetermined target lateral stiffness different than the predetermined target vertical stiffness. The armrest further includes a skin arranged with the elastic core to form the automotive armrest. Each of the channels has a cross-section defined by a lateral dimension and a vertical dimension. The lateral dimension is less than the vertical dimension. The cross-sections may be ellipses. The cross-sections may be rhombuses. The channels may be arranged in a regular pattern. The widths, lengths, or both of some of the channels may be different. The channels may extend along a vertical axis of the core. The patterned array may include a same number of the channels in each row, column, or both. The elastic core and skin may be 3-D printed.

In another embodiment, an automotive armrest is disclosed. The armrest may include a deformable core defining a patterned array of channels extending along a longitudinal axis thereof. The deformable core exhibits a predetermined target lateral stiffness and a predetermined target vertical stiffness greater than the predetermined target lateral stiffness. Each of the channels has a cross-section defined by a lateral dimension and a vertical dimension and wherein the lateral dimension is less than the vertical dimension. The cross-sections may be ellipses. The cross-sections may be rhombuses. Some of the cross-sections may be different. The patterned array may be symmetric. The dimensions of some of the channels may be different. The channels may constitute at least about 20% of a surface area of the deformable core's cross section.

In yet another embodiment, a method of producing a portion of an automotive armrest is disclosed. The method may include printing an elastic core having an internal structure that includes a patterned array of channels extending therethrough. The elastic core exhibits a predetermined target vertical stiffness and a predetermined target lateral stiffness different than the predetermined target vertical stiffness. The channels may have a same orientation along a longitudinal axis of the elastic core. The method may include printing a skin on the elastic core. The method may further include printing the elastic core from a first material and printing the skin from a second material different than the first material. The patterned array may be symmetrical. The patterned array may include a same number of channels in each row, column, or both.

DETAILED DESCRIPTION

Figure 1A:
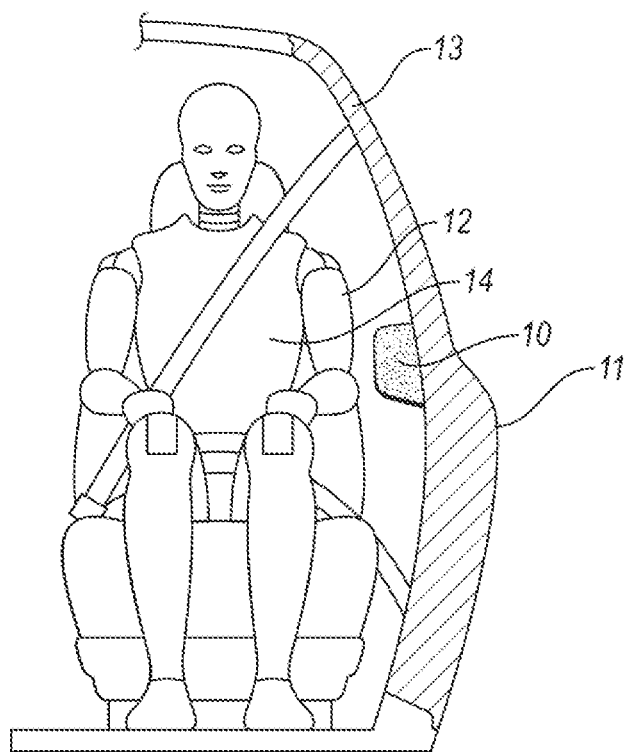
FIG. 1A depicts a front view of a vehicle including a door panel having an armrest facing an occupant's rib cage.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 1B:
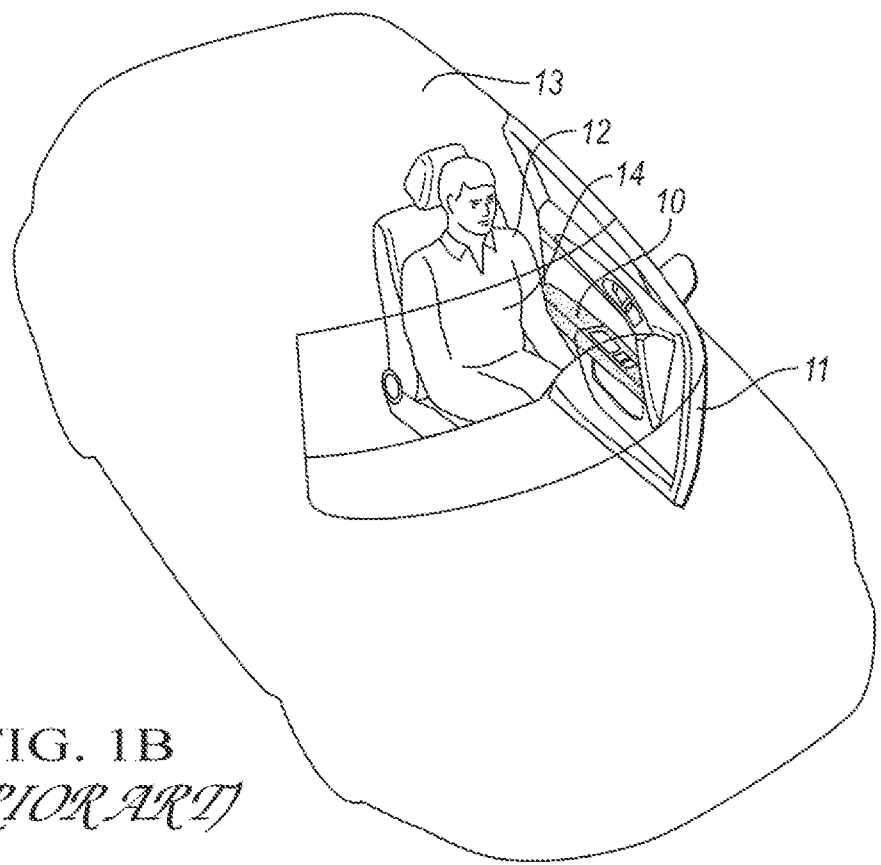
FIG. 1B depicts a perspective view of a vehicle including a door panel having an armrest facing an occupant's rib cage.

Typically, a passenger vehicle is equipped with a number of armrests such as a central armrest which may fold away, provide storage, cup holders, the like, or a combination thereof. Additionally, the front seat may offer one or two foldable armrests. It is also typical to include armrests built into the front and rear doors, or the side of the vehicle if there is no rear door. These built-in armrests are required to be sufficiently strong to meet design and impact specifications. A typical built-in armrest 10 of a front door 11 of a vehicle 13 and the position of the armrest 10 relative to the occupant 12 is depicted in FIGS. 1A and 1B. As can be seen, the armrest 10 is aligned with the occupant's rib cage 14.

Figure 2A:
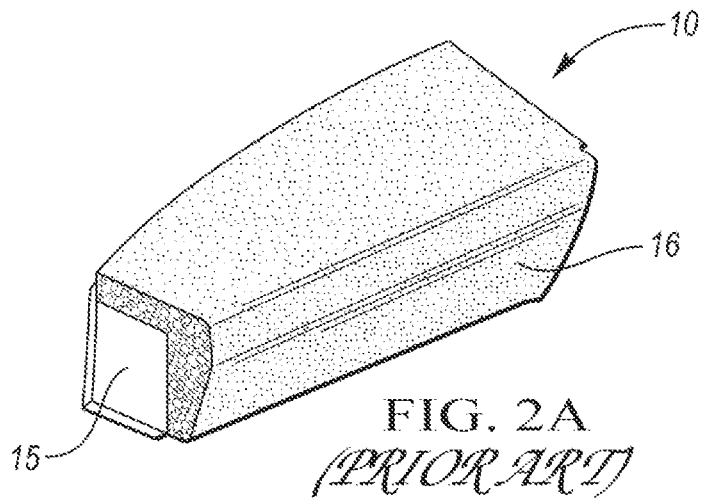
FIG. 2A depicts a perspective view of an armrest depicted in FIG. 1 having a stiff core and an outer layer.
Figure 2B:
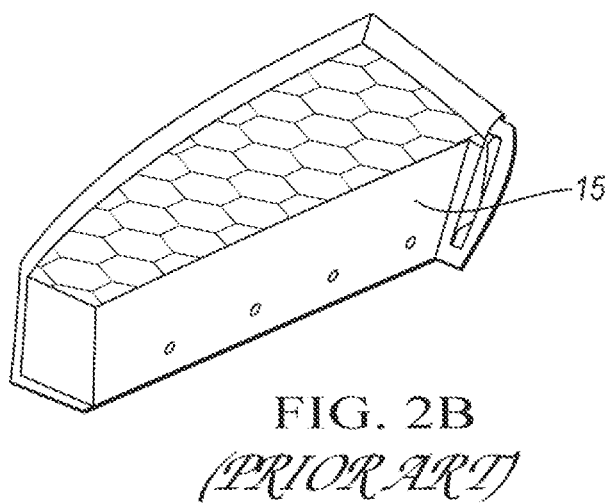
FIG. 2B depicts a perspective view of the core depicted in FIG. 2A.
Figure 2C:
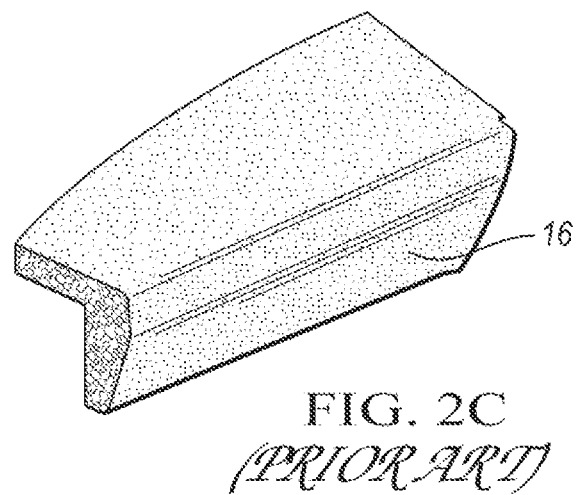
FIG. 2C illustrates a perspective view of the outer layer depicted in FIG. 2A.

The structure of a typical armrest 10 is depicted in FIG. 2. The armrest 10 includes a stiff core 15 and an outer layer 16. The stiff core 15 may include a honeycomb structure which is typically extruded. The outer layer 16 may include inflatable rubber or a plastic skin which is attached to the stiff core 15. Manufacturing of the armrest 10 may be costly and time consuming because the stiff core 15 and the outer skin 16 are produced separately and have to be assembled together which adds an additional step to the manufacturing process. Therefore, there is a need for an economical and efficient method of producing a built-in armrest.

Figure 3:
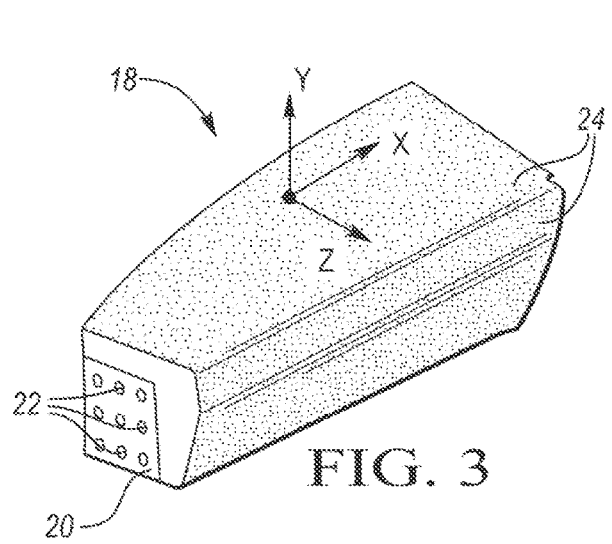
FIG. 3 shows a perspective view of an exemplary armrest having a core including horizontally-oriented channels and a skin according to one or more embodiments.

In one or more embodiments, depicted in FIG. 3, an armrest 18 is disclosed. The armrest 18 and its portions may have any shape, size, or form as long as the armrest 18 is capable of serving its function of providing support to an occupant's arm. The armrest 18 includes a core 20 with a patterned array of channels 22 within its interior. The armrest 18 may further include a skin 24 arranged with the core 20 to form the armrest 18. The skin 24 may also include an array of plurality of channels, the array being the same or different than the array within the core 20. When the skin 24 forms a portion of the armrest 18, the core may form at least about 50, 60, 70, 80, 90%, or more of the total mass of the armrest 18. The armrest 18, the core 20, and/or the skin 24 may be deformable, elastic, collapsible, malleable, flexible, yielding to lateral impact, or a combination thereof.

Figure 4A:
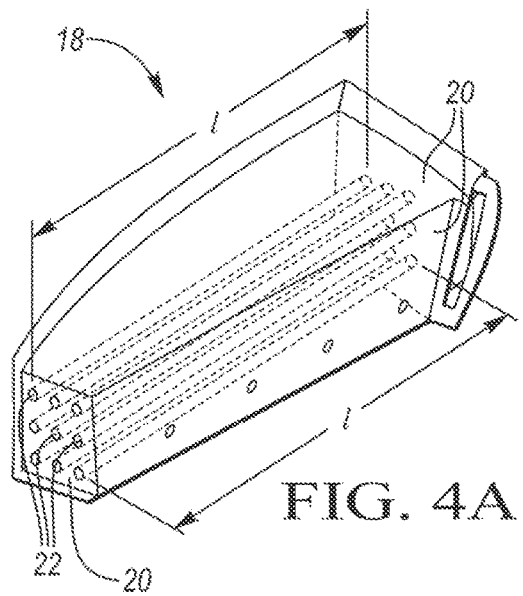
FIGS. 4A-4C show perspective views of the armrest depicted in FIG. 3 and its internal structure.
Figure 4B:
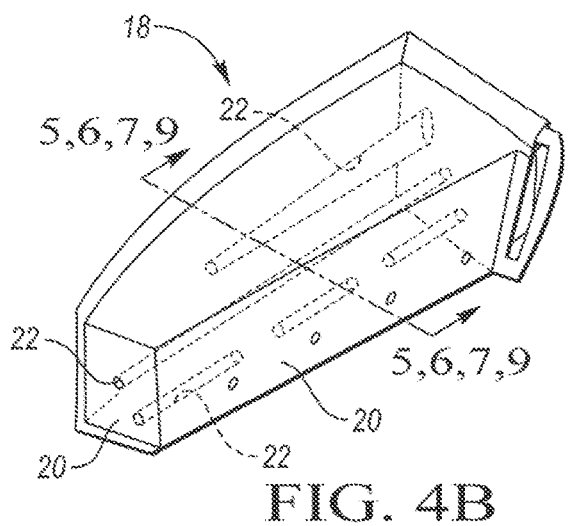
Figure 4C:
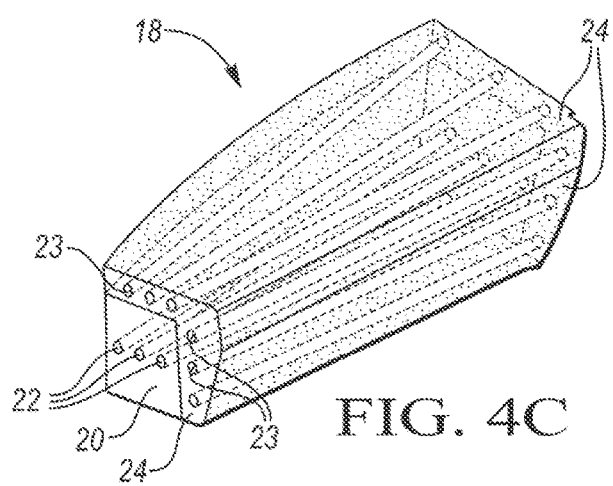

Referring to FIGS. 4A-4C, a number of channels 22 extend along the longitudinal axis x of the core 20. The dimensions, orientation, number, pattern, geometry, or a combination thereof allow the armrest 18 to have different stiffness response in different directions. Specifically, the core 20 is designed to exhibit a predetermined target lateral stiffness which is different than the predetermined target vertical stiffness. The target lateral stiffness along the axis z is relatively smaller than the target vertical stiffness along the y axis. The difference in the stiffness response allows the armrest 18 to meet structural requirements while also sufficiently compressing laterally during a side impact.

As is illustrated in FIGS. 4A and 4B, depicting exemplary prospective views of the core 20 depicted in FIG. 3, one or more of the channels 22 extending through at least a portion of the core 20 may have the same or different dimensions. At least about 10%, 20%, 30%, 40%, 50%, 60%, 70%, 80%, or more of the channels 22 may have the same, length, width, height, or a combination thereof. As can be seen in FIG. 4A, all of the channels 22 may have the same length 1. Alternatively, as can be seen in FIG. 4B, at least one channel 22 may have a length different from the remaining channels 22. The channels 22 may run the entire length of the core 20 along the axis x. Due to the varying dimensions of the core 20, all channels 22 may run the entire length of the core 20 while having different lengths. As is shown in FIG. 4B, at least one channel 22 may be interrupted by the core material 20 at one or more locations. Several portions of such channel 22 are thus separated from one another while being aligned along the same axis. Additionally, in one or more embodiments, the channels 22 may feature different thickness and/or shape throughout their length, as can be further seen in FIG. 4B.

FIG. 4C further illustrates an alternative embodiment in which the skin 24 has a sufficient thickness to form a substantial portion of the armrest 18 and contains at least one channel 22, 23, or both within the skin 24. Channels 23 have at least one different property such as an orientation, dimensions, number, pattern, geometry, or purpose than channels 22. For example, the channels 23 may have smaller or larger dimensions than at least one channel 22. The channels 23 may have higher density within the skin 24 than is the density of channels 22 within the core 20. The channels 23 may be orientated along a different axis than the longitudinal axis x of the armrest 18. The channels 23 may be spaced in a different pattern than channels 22 or be spaced in a pattern which is not pre-determined. The channels 23 may have a different geometry with a different cross-section than channels 22. For example, the cross-section of channels 23 may be a square, a circle, a heptagon, an octagon, a nonagon, a trapezium, an irregular shape, an asymmetrical shape, the like, or a combination thereof. In yet another embodiment, at least one channel 23 may be incorporated in the core 20 also having channels 22, in the skin 24, or both, as long as the armrest 18 is still capable of providing lower target stiffness in the lateral direction than the target stiffness in the vertical direction.

Figure 4D:
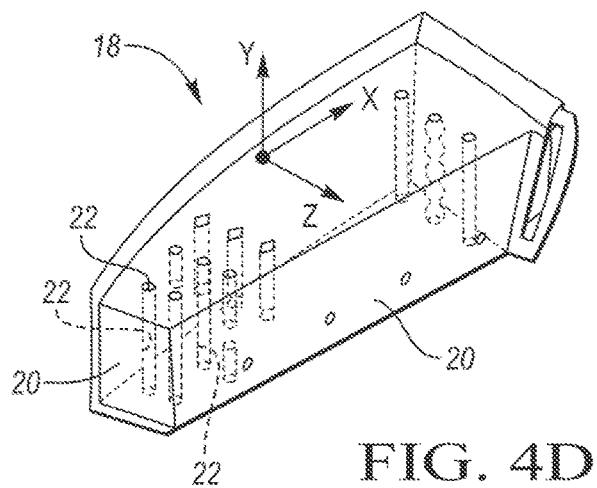
FIG. 4D shows a perspective view of an alternative armrest having vertically-oriented channels.

In yet another embodiment depicted in FIG. 4D, an armrest 18 having a core 20 including a number of channels 22 extending along the vertical axis y of the core 20 is disclosed. Alternatively still, the core 20 may include at least one portion having horizontally-oriented channels 22 and at least one portion including vertically-oriented channels 22. The core 20 in these embodiments is also designed to exhibit a predetermined target lateral stiffness along the axis z which is relatively smaller than the predetermined target vertical stiffness along the y axis, yielding different response in the two directions. The channels 22 oriented vertically along the y axis may have the same or different properties as the horizontally-oriented channels 22 described throughout this application. While FIGS. 5A-5F, 6A-6N, 7A-7E, and 9 depict cross-sectional views of the horizontally-oriented channels, the shown arrangements, dimensions, shapes, geometry, and patterns of the channels 22, as well as the description related to these figures, are also applicable to the vertically-oriented channels 22.

Figure 5A:
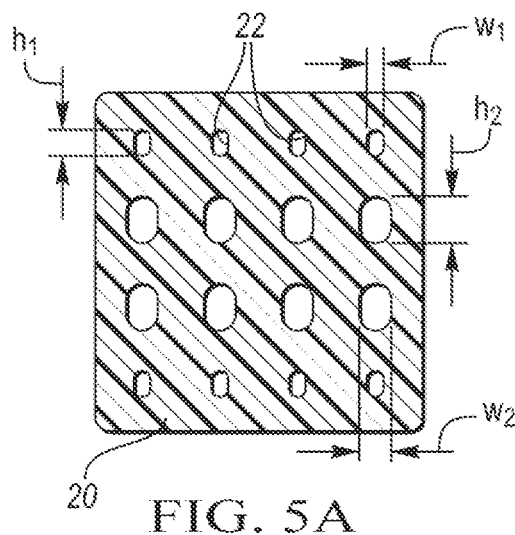
FIGS. 5A-5F show exemplary cross-sectional views of the core depicted in FIGS. 4A-4C.
Figure 5D:
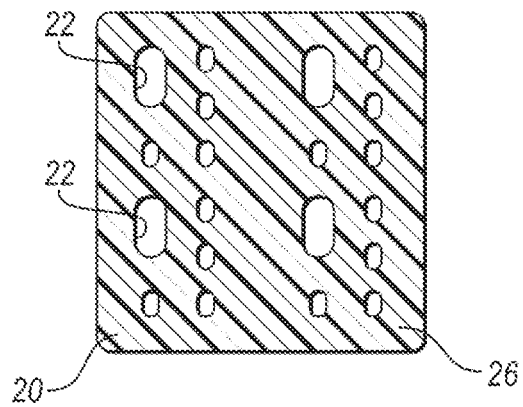
Figure 5B:
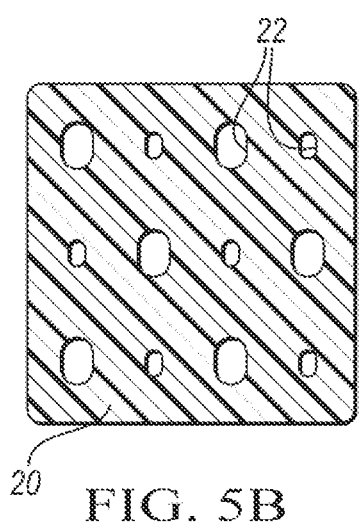
Figure 5E:
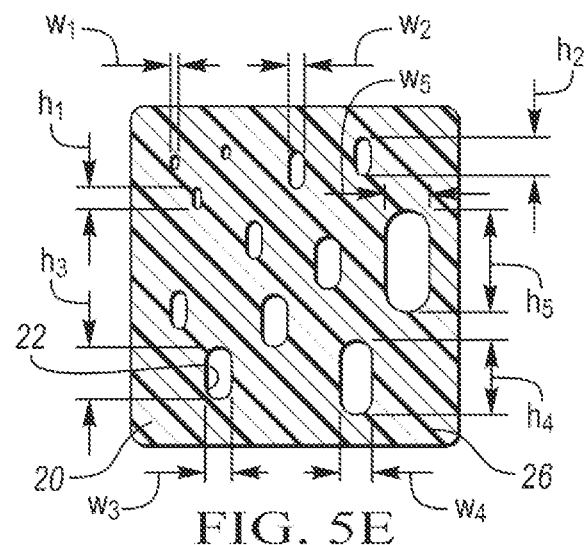
Figure 5C:
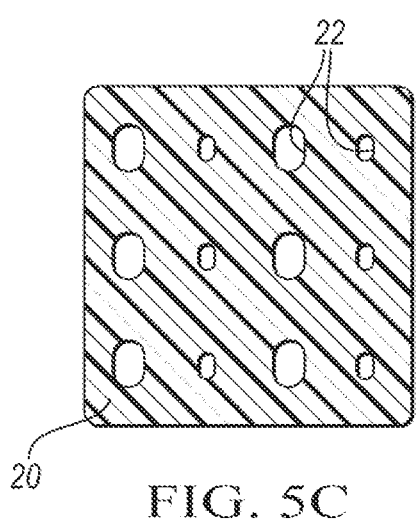
Figure 5F:
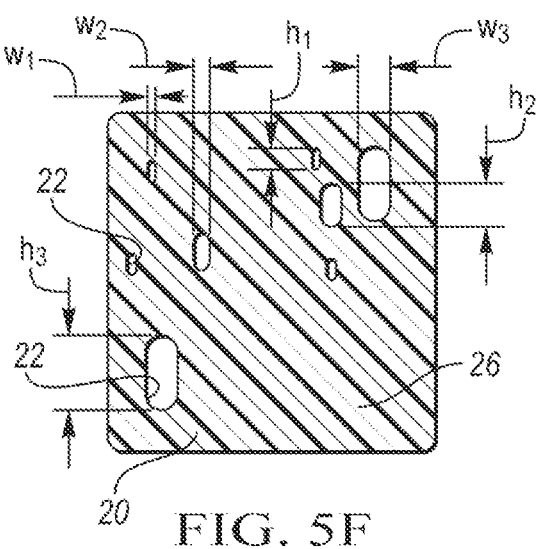

Referring now to the horizontally-oriented and vertically-oriented channels 22 within the core 20, the width w and/or height h of at least some of the channels 22 may be the same or different. The width w and height h of all the channels 22 may be the same, as FIG. 4A illustrates. Alternatively, the core 20 may include such arrangement of channels 22 in which channels 22 of at least two different widths and/or heights exist. Such arrangements are illustrated in FIGS. 5A-5D, depicting exemplary cross-sectional views of the core 20 depicted in FIGS. 4A-4C. FIGS. 5A and 5C illustrate a core 20 having channels 22 of the same width and height in more than one row or column, respectively. FIGS. 5E and 5F show a core 20 having channels 22 of at least three different widths and heights. The channels 22 having the same width and height may be evenly distributed throughout the core 20, as is illustrated in FIGS. 5B and 5D, or be randomly distributed, such as in FIG. 5F. Alternatively, the channels 22 may be distributed throughout the core 20 in such a manner so that the width and height of the channels 22 increases in one direction, for example in the direction towards the occupant (not depicted), as is shown in FIG. 5E. As FIG. 5F further illustrates, at least one portion 26 of the core 20 may be free of channels 22. Such portions 26 may constitute about 95%, 85%, 75%, 65%, 55%, 45%, 35%, 25%, 15%, or less of the surface area of the core's cross section.

The core 20 may include one or more channels 22. The number of channels 22 depends on specific requirements of a specific application and may be optimized, just as the dimensions, orientation, pattern, and geometry of the channels 22 may be optimized to meet desired specifications. The number of channels 22 refers to a number of channels per unit area of the core 20. For example, the core 20 may include one channel, 2, 3, 5, 10, 20, 30, 40, 50, or more channels per unit area of the core 20. The channels may form about 1%, 5%, 10%, 20%, 30%, 40%, 50%, 60%, 70%, 80%, or more of the surface area of the core's cross section.

Figure 6A:
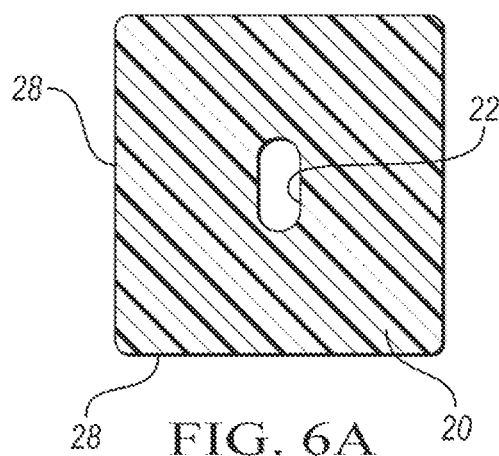
FIGS. 6A-6N show exemplary cross-sectional views of the core depicted in FIGS. 4A-4C.
Figure 6B:
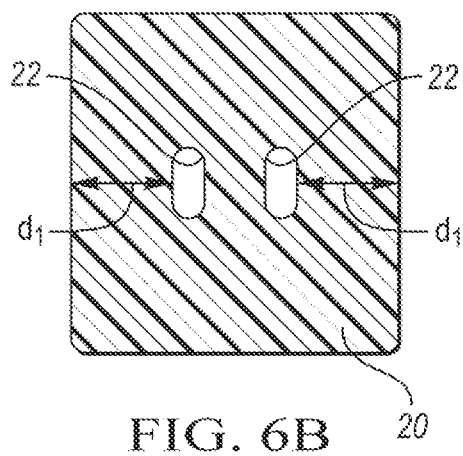
Figure 6C:
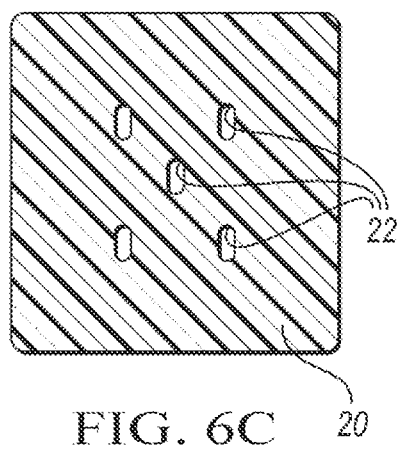
Figure 6D:
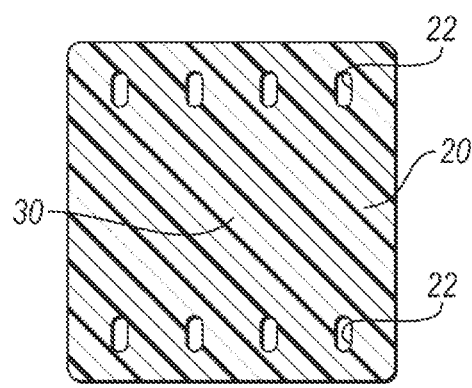
Figure 6E:
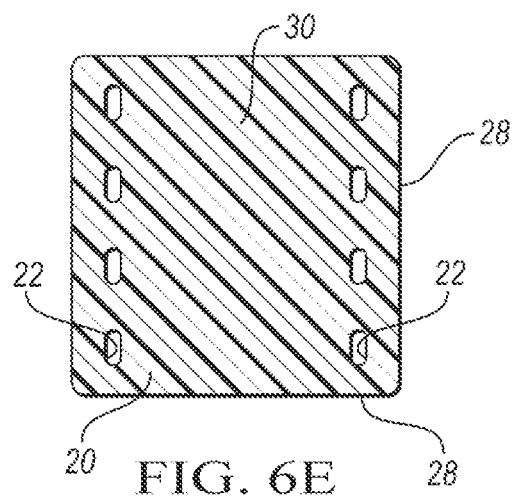
Figure 6F:
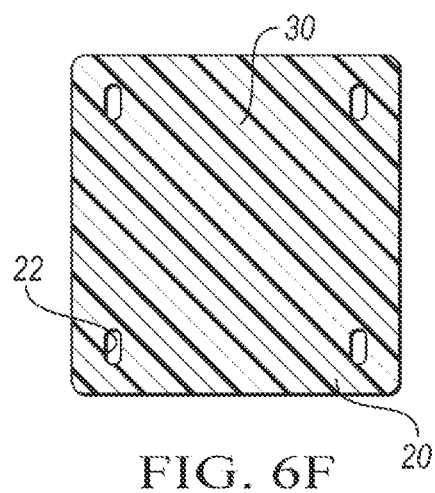
Figure 6G:
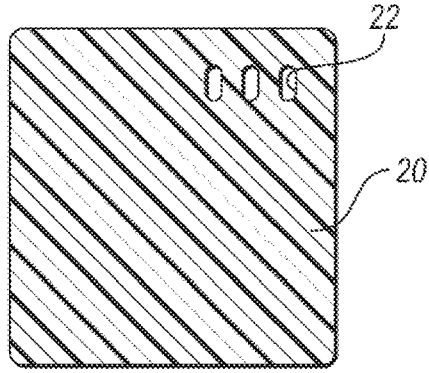

Exemplary cores 20 having a different number of channels are depicted in FIGS. 6A-6M showing cross-sectional views of the core 20 depicted in FIGS. 4A-4C. The one or more channels 22 may be located centrally within the core 20, as is illustrated in FIGS. 6A-6C. Alternatively, at least some of the channels 22 may be located alongside at least one side 28 of the core 20, which leaves the central portion 30 of the core free of channels 22. Such embodiments are shown in FIGS. 6D-6F. In an embodiment depicted in FIG. 6G, all of the channels 22 are located alongside just one side 28 of the core 20, leaving majority of the core 20 free of channels 22. The number of channels 22 in each row may be the same, as in FIGS. 6E and 6F, or different, as is illustrated in FIGS. 6H and 6I. Additionally, the number of channels 22 may be the same in each row and column, as can be seen in FIG. 6J. The channels 22 may be evenly distributed throughout the entire mass of the core 20, as in the embodiment depicted in FIG. 6J. Alternatively, all of the channels 22 may be clustered within a portion of the core 20, as can be seen in FIG. 6G.

Figure 6K:
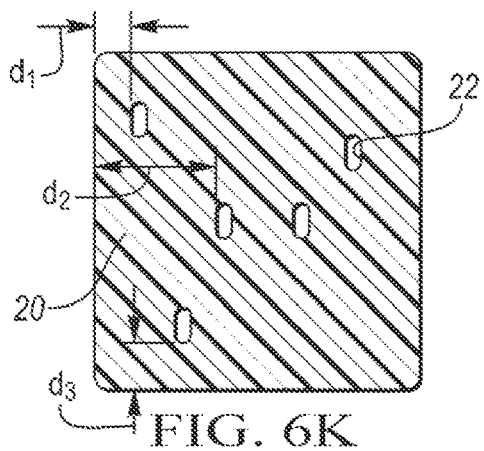
Figure 6H:
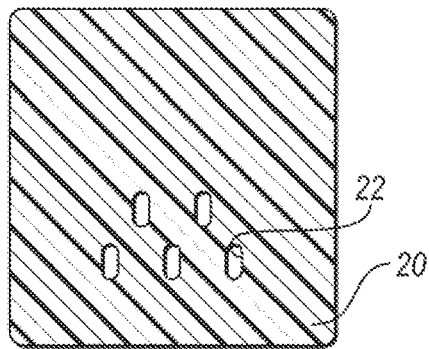
Figure 6L:
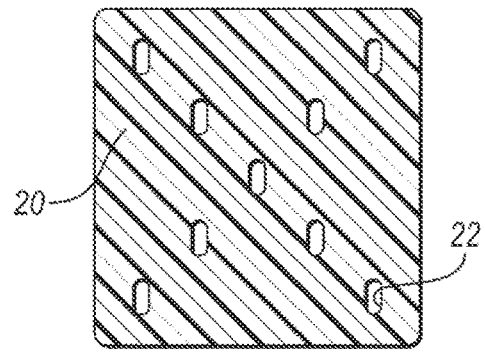
Figure 6I:
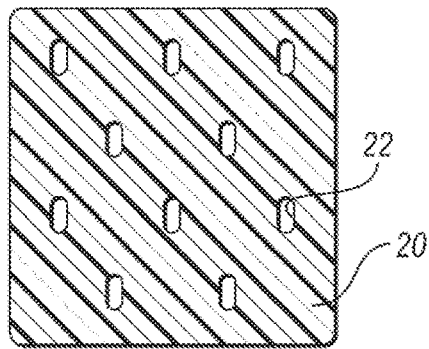
Figure 6M:
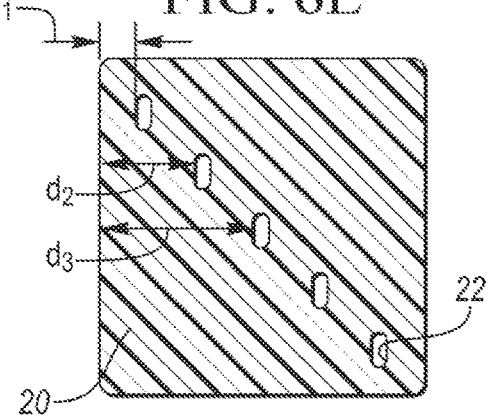
Figure 6J:
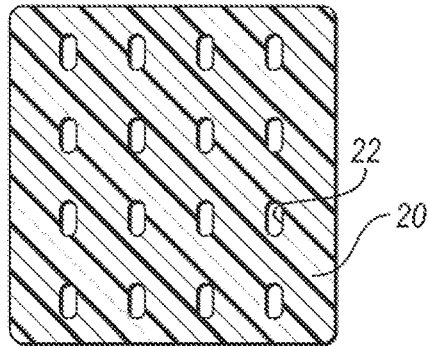
Figure 6N:
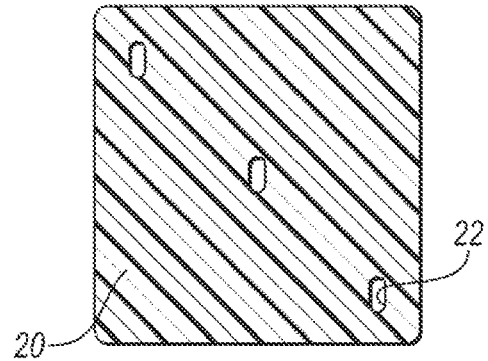

Additionally, the pattern of the array of the channels 22 may be regular, as can be seen in FIGS. 6I and 6J, irregular, illustrated in FIG. 6K, symmetrical, illustrated in FIGS. 6B-6F, or asymmetrical, illustrated in FIG. 6K. More than one pattern of channels 22 may be present in the core 20. The pattern may provide channels 22 in a diagonal direction of the core 20, as is illustrated in FIGS. 6L-6N. The pattern may have any design as long as the core 20 is capable of fulfilling its function of providing lower target stiffness in the lateral direction than the target stiffness in the vertical direction. In one or more embodiments, the distance d of each channel 22 from the closest side 28 of the core 20 may be the same, as is illustrated in FIGS. 6B and 6D-6F. Alternatively, the distance d between the channel 22 and the side 28 closest to the channel 22 may be different for at least some of the channels 22, as is illustrated in FIGS. 6K and 6M.

The geometry of the channels 22 may be the same or different for at least some of the channels 22 within the core 20. Each channel 22 has a cross-section having a lateral dimension or width w and a vertical dimension or height h. The lateral dimension is smaller than the vertical dimension so that the width w of each channel 22 is smaller than the height h of the channel 22. The ratio of w to h may be the same of different for at least some of the channels 22. The ratio of w:h may be from about 1:2 to 1:5. At least about 10%, 20%, 30%, 40%, 50%, 60%, 70%, 80%, or more channels 22 may have the same cross-section. Providing the same cross-section for all the channels 22 may simplify the armrest's manufacturing process. Yet, customization of the geometry of the channels 22 may provide further opportunity to optimize properties of the armrest 18 locally.

Figure 7A:
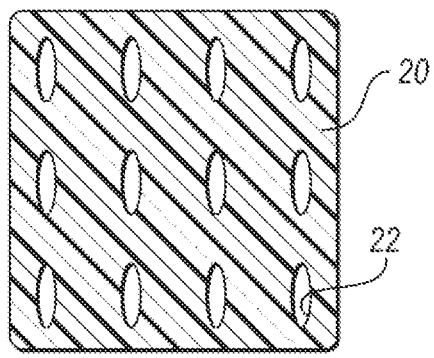
FIGS. 7A-7E show exemplary cross-sectional views of the core depicted in FIGS. 4A-4C.
Figure 7B:
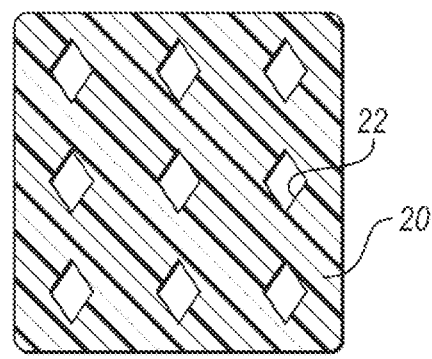
Figure 7C:
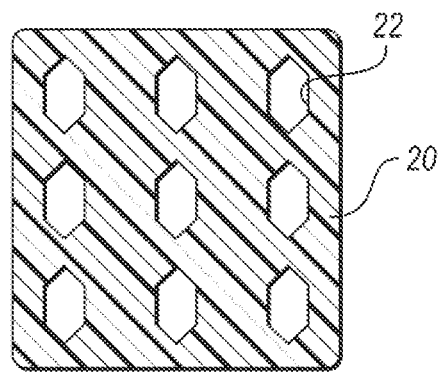
Figure 7D:
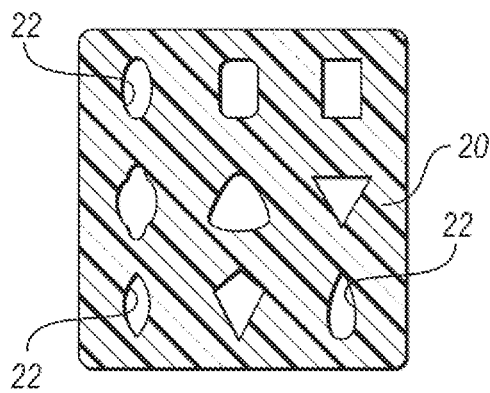
Figure 7E:
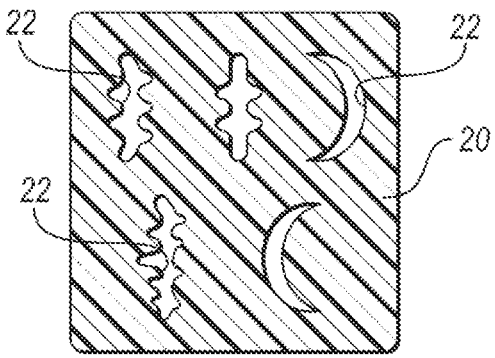

The cross-section of the channel 22 may be an ellipsis, illustrated in FIG. 7A; a rhombus, illustrated in FIG. 7B; a hexagon elongated along its vertical axis, illustrated in FIG. 7C; an oval, a rounded rectangle, a rectangle, an elongated quatrefoil, a curvilinear triangle, a triangle, a double-convex lens, a kite, a folium, as is illustrated in Figure FD. Other shapes having a lateral dimension smaller than the vertical dimension are contemplated. For example, the channels 22 may have a leaf shape elongated along its vertical axis having a plurality of lobes or a shape of a crescent, as is shown in FIG. 7E. The number of lobes on each side of the leaf-shaped channel 22 may be the same or different for each channel 22. Additionally, each channel 22 may be symmetrical or asymmetrical along at least one axis.

To produce an armrest 18 having the core 20 featuring an array of channels 22, as was described above, a 3-D printing method is disclosed. 3-D printing, also known as additive manufacturing, describes a number of various processes used to synthesize a solid three-dimensional object from a digital file based on a 3-D model or another electronic data source. In an additive manufacturing process, an object is created by laying down successive layers of material until the entire object is created. Each of these layers can be seen as a thinly sliced horizontal cross-section of the final object.

A variety of 3-D printing techniques have been developed such as vat photopolymerization including stereolithography, material jetting, binder jetting, material extrusion, powder bed fusion, sheet lamination, directed energy deposition. All of the techniques utilize the following principles and at least some of these techniques may be used to produce the armrest 18 described throughout this disclosure. A virtual design of the object is created in a Computer Aided Design (CAD) file using a 3-D modeling program or with the use of a 3-D scanner which makes a 3-D digital copy of the desired object. Any other device capable of digitizing real objects into 3-D models may be implemented. The digital file contains data about the sliced object to be created so that the desired object may be created layer by layer. The 3-D printer reads every slice and forms the object while blending each layer with the next layer so that there are hardly any visually discernable signs of the discreetly applied layers. The layers form the three-dimensional solid object.

Figure 8:
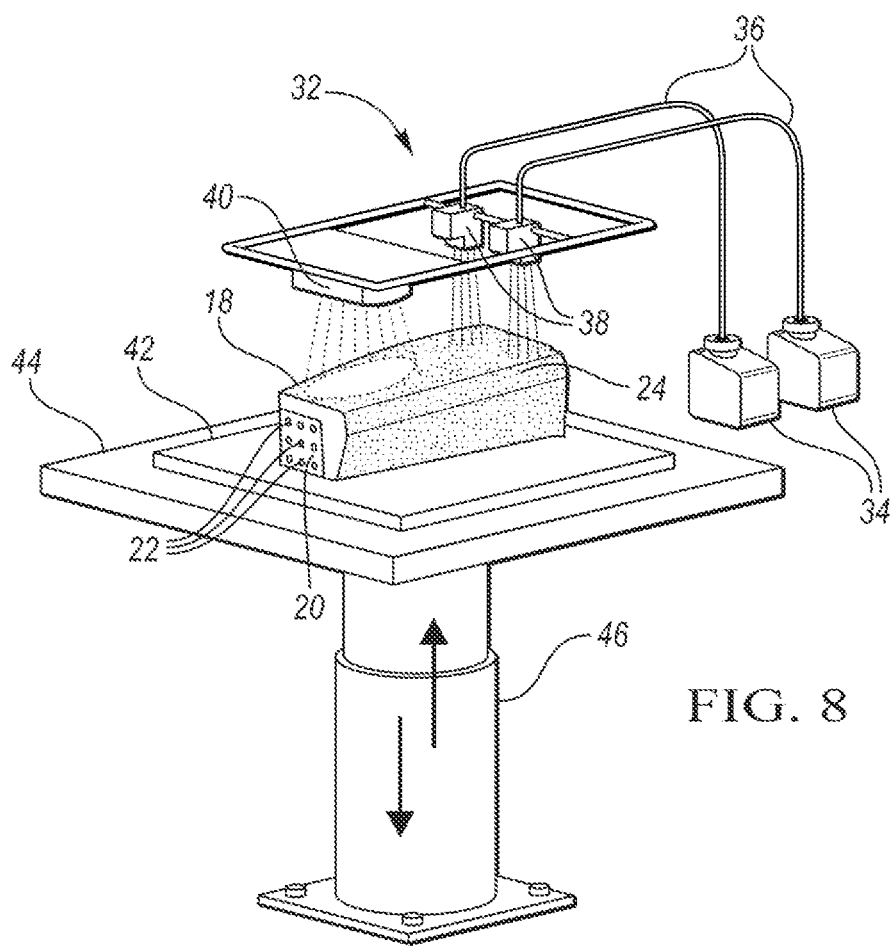
FIG. 8 illustrates a perspective schematic view of an exemplary 3-D printing system capable of producing an armrest according to one or more embodiments.
Figure 10A:
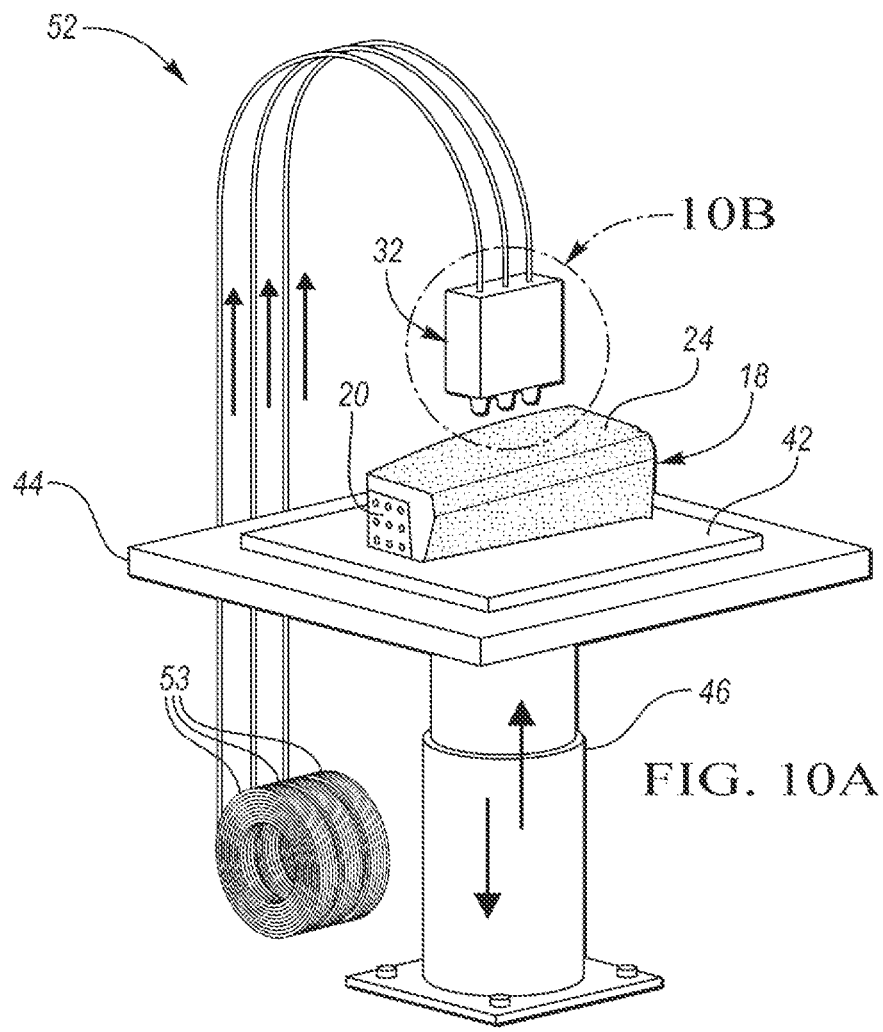
FIG. 10A shows a perspective schematic view of an exemplary 3-D printing system having an extrusion head capable of producing an armrest according to one or more embodiments.
Figure 10B:
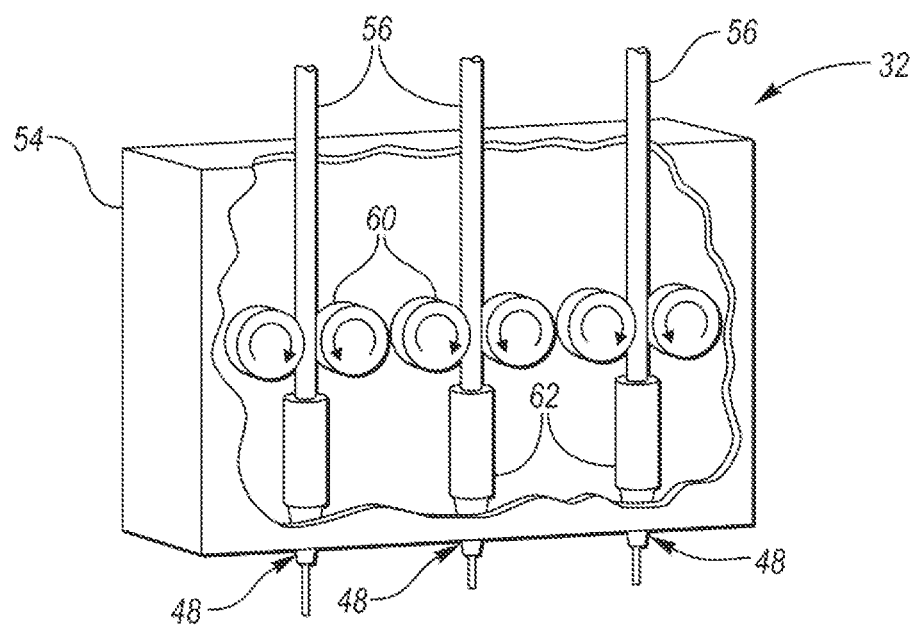
FIG. 10B shows a detailed view of the extrusion head depicted in FIG. 10A.

Exemplary 3-D printer systems 32 and 52 are depicted in FIGS. 8, 10A, and 10B. However, any other device capable of 3-D printing the customizable skin 24 and the internal structure of the core 20 including an array of channels 22, as described above, may be utilized to produce the armrest 18. The systems 32 and 52 may further include a scanner, a computer system, and other conventional parts enabling the printer functions that are not depicted. The type of material(s) the armrest 18 will be 3-D printed from determines the type of the 3-D printer to be utilized. For example, if a resin is used, stereolithography, digital light processing, or a multijet 3-D printer system may be implemented. Alternatively, if polymeric materials are used, fused deposition modelling or selective laser sintering may be the viable methods of producing the armrest 18.

Figure 9:
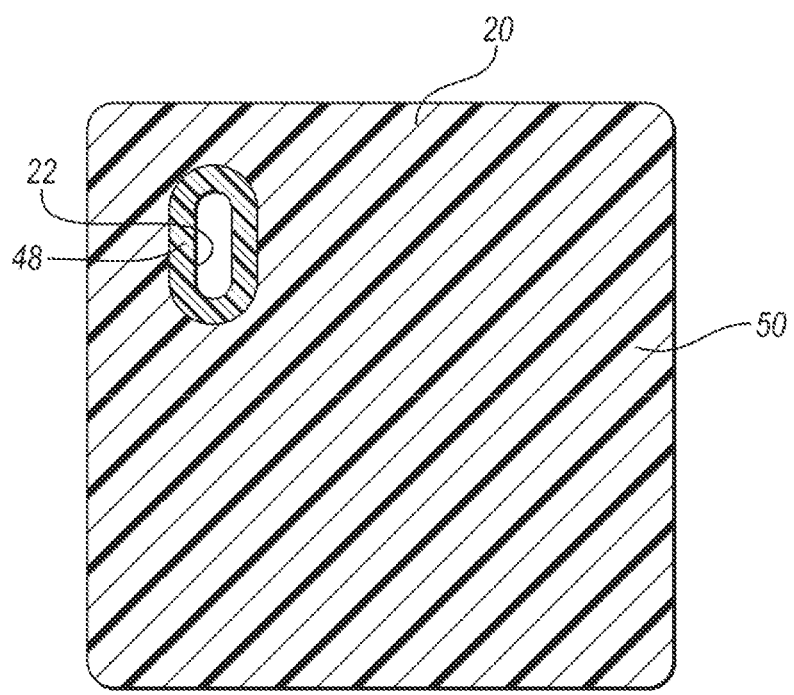
FIG. 9 illustrates a cross-sectional view of the core depicted in FIGS. 4A-4C.

An exemplary 3-D printer system 32, using stereolithography, is illustrated in FIG. 8. The system 32 may include a number of parts such as one or more material supply containers 34, supply lines 36, inkjet printer heads 38, a UV curing lamp 40 for crosslinking the material, a building substrate 42, a building platform 44, an elevator 46 for raising the building platform 44, or the like. As can be seen in FIG. 8, the 3-D printing method utilizing this printing system 32 may include producing the armrest 18 from two different materials and applying both materials layer by layer at the same time. The material for the core 20 may be supplied from one printer head 38 while the material for the skin 24 may be supplied from a second printer head 38. Both printer heads 38 are connected to their respective supply container 34 via a supply line 36. Alternatively, the method may include producing both the core 20 and the skin 24 from the same material. Alternatively still, the method may include forming the core 20 and/or the skin 24 from more than two materials. Therefore, at least one portion of the core 20 and/or the skin 24 may be formed from a different material than the remainder of the core 20 and/or the skin 24, respectively. For example, as is illustrated in FIG. 9, a portion 48 surrounding the channel 22 within the core 20 may be formed from one material while at least one other portion 50 of the core 20 may be formed from a different material. This allows for further localized optimization of properties of the armrest 18. For example, a portion of the armrest 18 closest to the occupant 12 may be formed from a different material than a portion of the armrest 18 closest to the vehicle exterior. Thus, during the side impact, the occupant's body may come in contact with the softest portion of the armrest 18, which may further protect the occupant's ribcage or other parts of the occupant's body from potential damage.

In another embodiment, an exemplary 3-D printer system 52 for fused deposition modeling, illustrated in FIG. 10A, is used. The 3-D printing system 52 may include the following components: one or more material supply spools 53, a building substrate 42, a building platform 44, an elevator 46, and an extrusion head 54. The system 52 may include one, two, or more supply material spools 53 so that the armrest 18 may be produced from one, two, or more different materials, as was described above. One of the supply material spools 53 may provide a material providing support to the armrest 18 which is being 3-D printed. The extrusion head 54, illustrated in detail in FIG. 10B, includes one or more extrusion nozzles 56 into which the material filament 58 from the material supply spools (depicted in FIG. 10A) is being provided. The filament 58 is being moved along by a drive mechanism 60 before reaching liquefiers 62. The liquefied material is then deposited layer by layer according to the digital file and forms the armrest 18, optionally at least partially surrounded by a support structure formed from the support material.

The materials which may be used to produce the core 20, the skin 24, or both may be optimized based on the requirements of a specific application such as a required strength, softness, pliability, color, environmental concerns, customer preference, etc. For example, the materials may be free of or contain only a small amount of odors and harmful materials such as styrene, produce low emissions or warping, or a combination thereof. The materials should enable production of accurate and repeatable armrests 18 which are stable over time, functional, durable, wear-resistant, fade-resistant, chemical-resistant, water-resistant, UV-resistant, have good thermal resistance, memory retention, desired gloss, color, mechanical properties such as toughness, strength, dimensional stability, the like, or a combination thereof. At least one material used may further provide a slight stretch to the armrest 18 and/or provide a soft and yielding area of the armrest 18 which enhances the difference in lateral and vertical stiffness response of the armrest 18. Such material may be, for example, a thermoplastic elastomer which allows production of a soft, elastic core 20 and/or skin 24 similar to soft rubber.

The core 20 and the skin 24 may be produced from the same material or materials. Alternatively, a harder, more rigid material may be used for the core 20 and a softer material for the skin 24. Additionally, at least the materials used for the production of the skin 24 should produce a visually and texturally appealing cover of the armrest 18. Additionally, the skin 24 and/or the core 20 may be formed from one or more materials having a color and/or texture matching the vehicle interior such as an imitate leather or wood grain. Alternatively, the materials used for the skin 24 and/or the core 20 may enable the armrest 18 to visually stand out in comparison to the remainder of the vehicle interior.

Exemplary materials the core 20 and/or the skin 24 may be 3-D printed from may include thermoplastics such as acrylonitrile butadiene styrene (ABS), ABS-based thermoplastics such as ABSplus, ABS-M30, ABSi, ABS-M30i, ABS-ESD7, polycarbonate (PC), PC-ABS, polyetherimide (PEI) resin, polyphenylsulfone (PPSF/PPSU), nylon, polyamide (PA), polystyrene (PS), polylactic acid (PLA), acrylonitrile styrene acrylate (ASA), thermoplastic elastomer (TPE), engineered plastics, the like, or a combination thereof. Other exemplary materials may include liquid UV-curable photopolymer resins such as epoxy-based or acrylate-based resins and other engineered resins.

Figure 11:
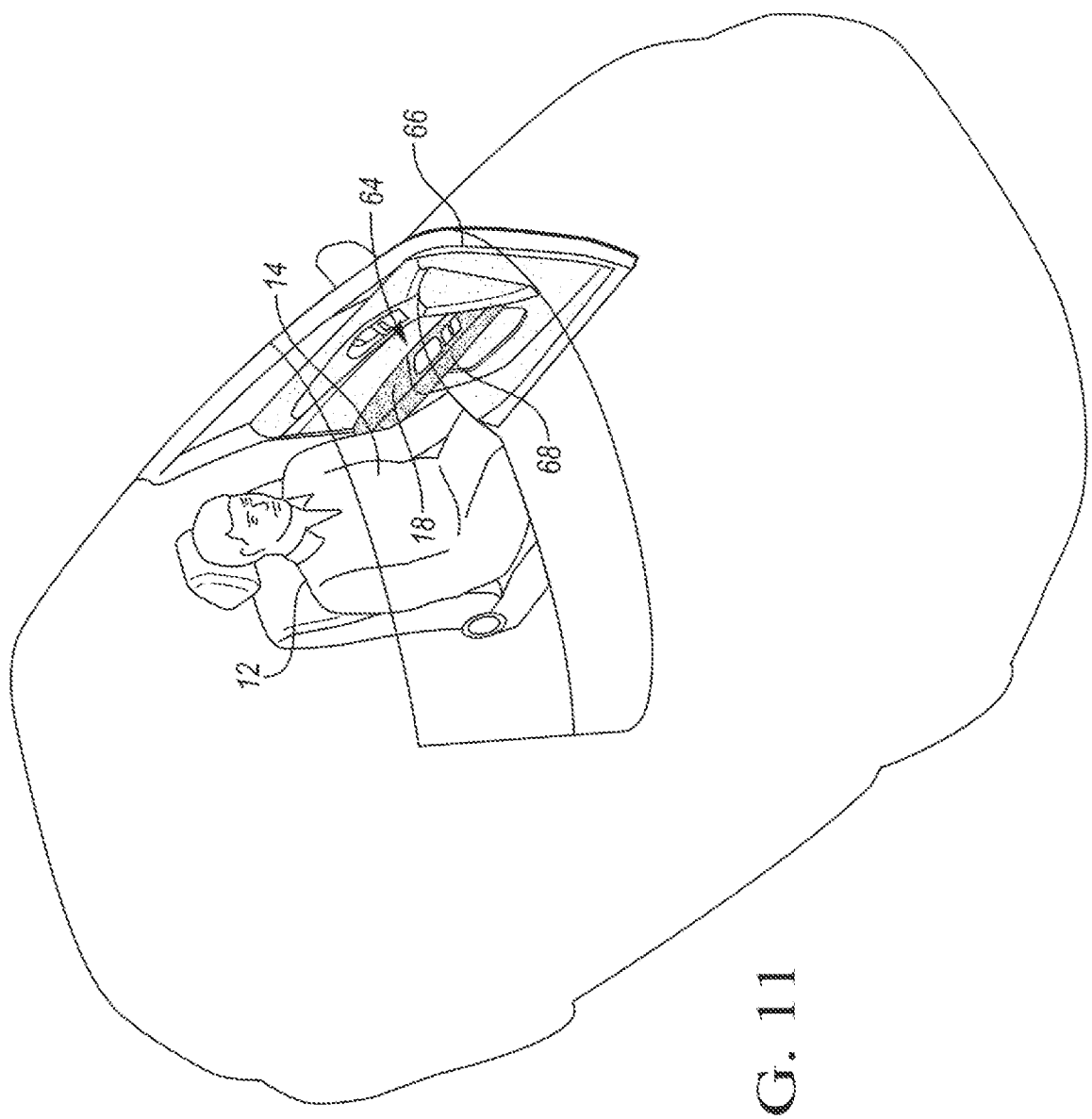
FIG. 11 depicts a perspective view of a vehicle including a door panel having an armrest facing an occupant's rib cage according to one or more embodiments.

Referring to FIG. 11, the armrest 18 produced by the method described above may form the entire armrest area 64 of the vehicle door or back panel 66. Alternatively, the armrest 18 may form only a portion of the entire armrest area and be connected to another portion 68 which is formed differently, at least partially from different materials such as harder plastic materials, or both. The connection may be produced by any conventional method. Additionally, if the armrest portion 18 forms only a portion of the entire armrest area 64, no discernable difference between the portions may be apparent and the entire armrest area 64 may appear as a single piece. For example, this may be possible by 3-D printing the core 20 and/or the skin 24 from a material which will mimic the design of the remaining portion 68. Alternatively, only the core 20 may be printed, connected to the remaining portion 68, and an outer layer may be secured to the entire armrest area 64.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of producing a portion of an automotive armrest, comprising:
    3-D printing an elastic core having an internal structure that includes a patterned array of channels extending therethrough such that the elastic core exhibits a predetermined target vertical stiffness and a predetermined target lateral stiffness different than the predetermined target vertical stiffness, wherein the channels including a plurality of rows and columns, the channels in each row having a vertically-elongated orientation along a longitudinal axis of the elastic core; and
    3-D printing a skin on the elastic core.

2. The method of claim 1 further comprising 3-D printing the elastic core from a first material and 3-D printing the skin from a second material different than the first material.

3. The method of claim 1, wherein the patterned array is symmetrical.

4. The method of claim 1, wherein the patterned array includes a same number of channels in each row, column, or both.

5. A method of forming an automotive armrest, comprising:
    3-D printing an elastic core defining a patterned array of channels including a plurality of rows and columns, the channels in each row having a vertically-elongated orientation extending therethrough such that the elastic core exhibits a predetermined target vertical stiffness and a predetermined target lateral stiffness different than the predetermined target vertical stiffness; and
    3-D printing a skin arranged with the elastic core.

6. The method of claim 5, wherein the patterned array includes channels organized in a plurality of rows and columns, wherein a same number of the channels is present in each row, or wherein a same number of the channels is present in each column.

7. The method of claim 5, wherein each of the channels has a cross-section defined by a lateral dimension and a vertical dimension and wherein the lateral dimension is less than the vertical dimension.

8. A method of forming an automotive armrest, comprising:
    3-D printing a deformable core defining a patterned array of channels arranged in a plurality of rows and columns, the channels having a cross-section defining a lateral dimension and a vertical dimension greater than the lateral dimension such that the deformable core exhibits a predetermined target vertical stiffness greater than a predetermined target lateral stiffness; and
    3-D printing a skin arranged with the deformable core.

9. The method of claim 8, wherein a same number of the channels is present in each row.

10. The method of claim 8, wherein a same number of the channels is present in each column.

* * * * *